Aug. 31, 1926.
K. W. WAGNER
1,597,937
HIGH FREQUENCY THREE-PHASE SYSTEM
Filed Jan. 13, 1926
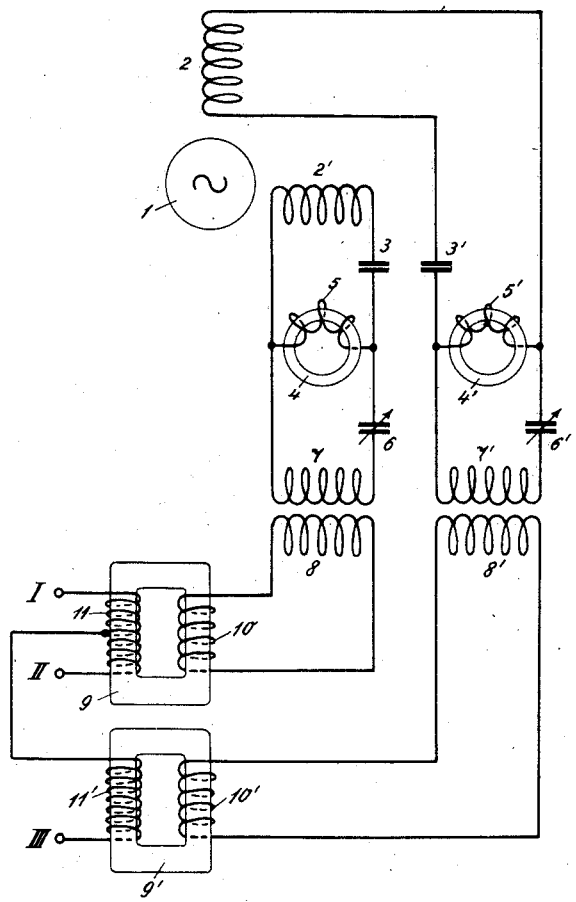
Inventor:-
Karl Willy Wagner
by
Attorney Patented Aug. 31, 1926.

1,597,937

UNITED STATES PATENT OFFICE.

KARL WILLY WAGNER, OF BERLIN-LANKWITZ, GERMANY, ASSIGNOR TO C. LORENZ AKTIENGESELLSCHAFT, OF BERLIN-TEMPELHOF, GERMANY.

HIGH-FREQUENCY THREE-PHASE SYSTEM.

Application filed January 13, 1926, Serial No. 80,972, and in Germany February 23, 1925.

When transforming a three-phase current into a higher frequency, the phase difference may disappear under circumstances and a three-phase current will no more be obtained. This may be best ascertained in connection with three-phase current being multiplied to the triple frequency, whereby the currents obtained are in like phase. The present invention has for its object to overcome these inconveniences by starting not with a three-phase current, but with a two-phase current, whose two phases can be transformed into the desired higher frequency independent one from the other, the current retaining its character as a two-phase current. The two-phase multiplied high-frequency current is then transformed into a three-phase current by means of transformers connected in the well known Scott-connection.

The single view of the accompanying drawing shows a system embodying the invention. It has for its object to more fully explain the subject matter thereof. 1 is the rotor of a high-frequency machine, which may be of the common variable-inductance type, 2 and 2' are the two stator windings displaced by 90° with respect to each other. 4 and 4' are two iron-cored frequency transformers connected at their input sides with circuits resonant to the fundamental frequency and consisting of stator windings 2 respectively 2', tuning condensers 3 respectively 3' and transformer windings 5 respectively 5'. At their output sides the frequency transformers contain circuits 5, 6, 7, respectively 5', 6', 7', resonant to the desired mutiple frequency.

The two-phase multiplied frequency is applied to the primaries 10 resp. 10' of two transformers 9 respectively 9', by means of coupling coils 8 respectively 8', whose secondaries 11 respectively 11' are connected according to the well known Scott-connection (see U. S. Patent 622,866), a three-phase current being available at terminals I, II and III.

What I claim is:

In a high-frequency three-phase generator system comprising in combination a two-phase high-frequency generator, two frequency multiplying transformers each having its input circuit supplied by one phase of said generator, output circuits of said multiplying transformers transforming the fundamental frequency into a higher frequency, and Scott-connected transformers for transforming the thus obtained multiplied two-phase high-frequency current into a three-phase current.

In testimony whereof I have affixed my signature.

KARL WILLY WAGNER.